United States Patent [19]

Jackson

[11] 3,939,360
[45] Feb. 17, 1976

[54] LIQUID LEVEL SENSOR AND ELECTRODE ASSEMBLY THEREFOR

[75] Inventor: John A. Jackson, Oshawa, Canada

[73] Assignees: John A. Jackson; Albert Bangay, both of Scarborough, Canada; part interest to each

[22] Filed: Jan. 22, 1975

[21] Appl. No.: 543,193

Related U.S. Application Data

[63] Continuation of Ser. No. 409,631, Oct. 25, 1973, abandoned.

[52] U.S. Cl. ............... 307/118; 73/304 C; 137/392; 317/246
[51] Int. Cl.² ........................................ H01H 35/18
[58] Field of Search ............... 73/290, 304 C, 291; 307/118; 137/392, 386; 317/246

[56] References Cited
UNITED STATES PATENTS
3,073,160  1/1963  Shanhan ........................... 73/304 C OTHER PUBLICATIONS
Marsh, J. Kendall, "Two Frequency–Liquid–" from Electronics p. 90, Mar. 20, 1967.

Primary Examiner—Herman J. Hohauser
Attorney, Agent, or Firm—Rogers, Bereskin & Parr

[57] ABSTRACT

A system for detecting the fluid level in an intravenous bottle wherein a disposable electrode assembly, consisting of a piece of tape having upper, middle and lower electrode strips, is adhered to the bottle and connected to sensing equipment. The upper strip is longer than the middle strip and the middle strip is longer than the lower strip, so that the capacity between the upper and middle strips ($C_1$) is normally greater than that between the middle and lower strips ($C_2$). The sensing equipment includes a bias capacity ($C_3$) connected between the middle and lower strips so that $C_1$ is less than $C_2$ plus $C_3$ except when the tape is on a bottle with the fluid level in the bottle above the top strip. Pulses having a gradually sloped leading edge and a steep trailing edge are fed to the centre strip. The received pulses at the top and bottom strips are differentiated and fed to the inputs of a differential amplifier which produces an output which changes in polarity when the fluid drops below the upper electrode strip. A delay circuit generates an alarm signal after the changed polarity output signal has persisted for a predetermined interval. If the tape falls off the bottle or becomes disconnected from the sensing equipment, the alarm signal will be produced.

15 Claims, 11 Drawing Figures

LIQUID LEVEL SENSOR AND ELECTRODE ASSEMBLY THEREFOR

This application is a continuation of application Ser. No. 409,631 filed Oct. 25, 1973, now abandoned.

This invention relates to a system for detecting the level of liquid in a bottle of intravenous fluid, and to a disposable electrode for use in connection with such system.

Patients in hospitals are commonly given fluids intravenously. This procedure involves hanging a bottle containing the required fluid with the mouth of the bottle down, and plugging a tube into the bottle to conduct the fluid to the patient. Administration of the fluid must in all cases be terminated before the bottle is empty. It is also necessary in some cases to administer a predetermined quantity of fluid from a bottle containing more than the required quantity. At the present time, these matters are handled by nursing staff, who are supposed to watch closely the level of fluid in intravenous bottles. However, this diverts scarce nursing staff from other important tasks, and in addition the system is susceptible to human failure.

Various attempts have been made to provide automatic level monitors which will detect the level of intravenous fluid in a bottle and will sound an alarm if the fluid level becomes too low. These monitors have generally proved unusable for various reasons, e.g. requirements to insert devices inside the bottle with the risk of introducing contamination, and also commonly requiring specially formed bottles. Other types are known performing more functions, but at considerably greater cost. For these reasons, no intravenous level monitor has, so far as is known, ever been successful.

According to the invention in one of its aspects, the invention provides apparatus for detecting the level of fluid in a non-conducting container and comprising:

a. detector means mountable against the exterior surface of said container and having three spaced capacitance plate members, namely an upper member, a lower member and a middle member between said upper and lower members, the capacity between said upper and middle members being $C_1$, the capacity between said lower and middle members being $C_2$, and the value of $C_1$ being greater than that of $C_2$ when said detector means is located in air and also when said detector means is mounted on said container with the fluid level in said container above or below said detector means, b. circuit means including a bias capacitance of capacity $C_3$ detachably connected between said lower and middle members, the value of $C_3$ being such that when said detector means is located in air or on said container with the fluid level in said container below said upper member, the value of $C_1$ is less than the combined values of $C_2$ and $C_3$, and when said detector means is on said container with the fluid level in said container above said upper member, $C_1$ is greater than the combined values of $C_2$ and $C_3$, c. said circuit means including means for comparing the value of $C_1$ with the combined values of $C_2$ and $C_3$ and operative to produce an alarm signal when the value of $C_1$ is less than the combined values of $C_2$ and $C_3$.

In another of its aspects, the invention provides a disposable electrode assembly for use with apparatus for detecting the level of fluid in a nonconducting container and comprising a piece of adhesive tape, three flexible electrode strips adhered to said tape, said strips being an upper strip, a lower strip, and a middle strip located between said upper and lower strips, the capacity between said upper and middle strips being greater than that between said middle and lower strips when said assembly is located in air or is adhered to said container with the fluid level in said container above or below said assembly, and terminal means for detachably connecting a lead to each electrode strip.

Further objects and advantages of the invention will appear from the following description, taken together with the accompanying drawings, in which.

BOTTLE AND ELECTRODE STRUCTURE

Figure 1:
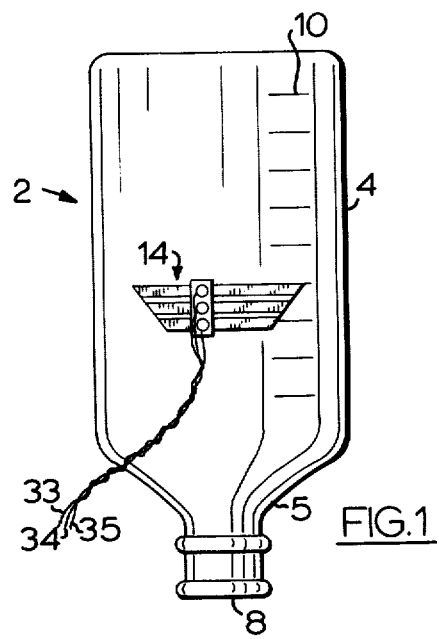
FIG. 1 is a side view showing an electrode assembly according to the invention in place on an intravenous bottle.

Reference is first made to FIG. 1, which shows a conventional glass intravenous bottle 2 having a cylindrical body 4, a tapered neck 5, and a mouth 8. Level markings 10 on the body indicate the level of fluid in the bottle.

According to the invention, a disposable electrode assembly generally indicated at 14 is secured to the bottle at a desired level, to indicate when the fluid level in the bottle falls below the desired level. The electrode assembly 14 typically includes a strip of pressure-sensitive adhesive tape having a base layer 16, an adhesive coating 18, and a set of electrodes 20, 21, 22 which may also be self-adhesive placed on the surface of the tape and adhered thereto. The electrodes 20, 21, 22 may be pieces of aluminum foil or other conductive elements and are provided with terminals 24, 25, 26 respectively so that connection can be made to the electrodes. Each terminal 24, 25, 26 may typically consist of a conventional male dome fastener having a lower ring 28 secured to an upper ring 30 and clamping the tape between them. The upper ring 30 has a conventional dome 32 adapted to be engaged by a female portion (to be described) of the fastener. It will be seen that the upper electrode 20 is longer than the centre electrode 21, the latter in turn being longer than the bottom electrode 22.

In use, the electrode assembly 14 will typically have a conventional strip of silicone treated release paper 15 protecting its adhesive coating 18. The paper 15 is scored through to the adhesive in two places indicated at 27, 29 to allow easy removal. After the release paper 15 is completely removed, the electrode assembly is then adhered to the bottle 2 so that the centre line of the upper and longer electrode 20 is at the desired alarm level, with the assembly 14 approximately horizontal and with the whole area coated with adhesive being adhered to the bottle surface so that the tape is not wrinkled.

A set of three wires 33, 34 and 35 suitably woven, terminated in female dome fasteners 36, 37 and 38 matching the male terminals 24, 25 and 26 is then clipped on to terminals 24, 25 and 26 and the electrode assembly is then ready for use. Preferably the female fasteners 36, 37, 38 are mounted as a unit in a piece of plastic or fibre board 38a so that they can be connected to and disconnected from the male fasteners.

ELECTRONIC CIRCUIT — PULSE GENERATOR AND CAPACITANCE RELATIONSHIP

Figure 4:
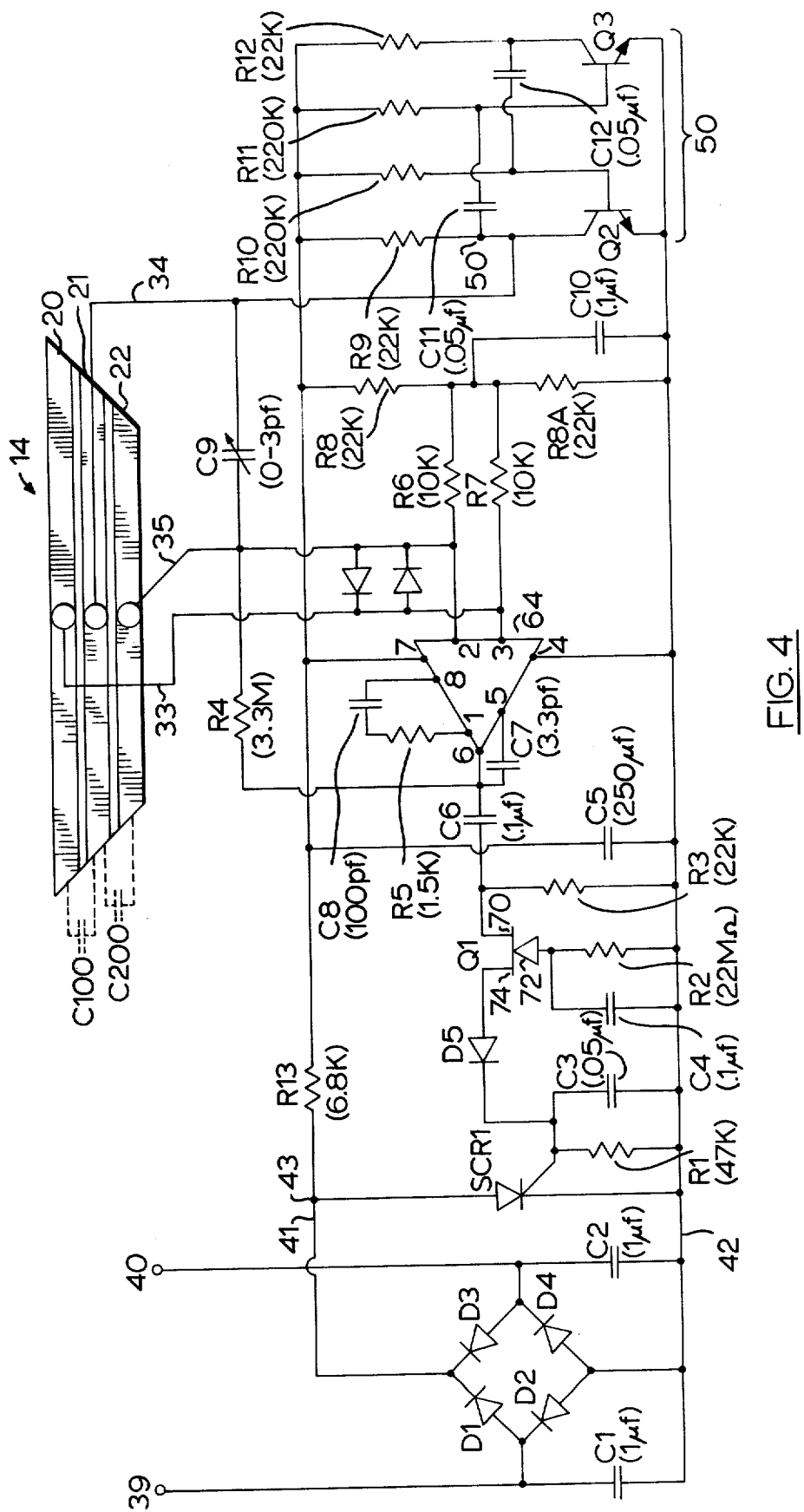
FIG. 4 shows a typical circuit according to the invention for use with the electrode system of FIG. 1.

The electronic circuit to which the leads 33, 34 and 35 are connected, and their respective connections, are shown in FIG. 4. This circuit, which may be termed a signal generating and detecting circuit, includes a pair of terminals 39 and 40 which supply alternating or direct voltage to the circuit from a source to be described later. This current which would typically be drawn from a 24 volt a.c. source flows normally through a full wave rectifier bridge circuit comprising diodes D1, D2, D3, D4 as shown. The output from the bridge feeds lines 41, 42 and typically causes line 41 to become 25 volts positive with respect to line 42.

Capacitors C1 and C2 connect line 42 to terminals 39 and 40 with respect to high frequency currents. As will be shown later terminals 39 and 40 will have a comparatively high capacity to "ground" if not a direct connection and line 42 will therefore also by virtue of capacitors C1 and C2 be virtually at "ground" potential with respect to high frequency currents. This assists in protecting the signal circuits from the effects of noise. Current through line 41 flows normally through resistor R13, which serves both to limit the normal current flow and to suppress with the aid of capacitor C5 ripple and noise voltages which may otherwise be present on line 41. Capacitor C5 bypasses such alternating currents and at the same time slows the rate of rise of voltage on line 41 so that the circuits connected are not subject to sudden voltage changes which may cause faulty operation. Capacitor C5 also acts as a store of power for a short period after the circuit is de-energised during operation as described later.

Figure 5A:
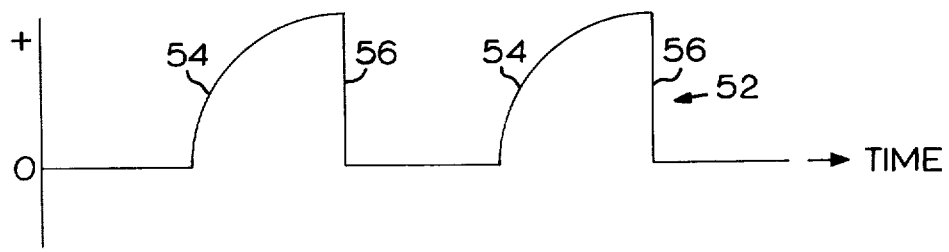
FIGS. 5A, 5B, 5C and 5D illustrates wave forms at various locations in the circuit of FIG. 4.

The power thus supplied through line 41 feeds a free running multivibrator 50 composed of resistors R9, R10, R11 and R12, capacitors C11 and C12, and transistors Q2 and Q3. The multivibrator 50 generates at point 51, i.e. at the collector terminal of transistor Q2, the waveform 52 shown in FIG. 5A. In waveform 52 the positive going edges 54 rise slowly due to the comparatively high time constant of resistor R9 and capacitor C11, when transistor Q2 is turned off, and the negative going edges 56 fall very rapidly due to the very low time constant of capacitor C11 and the low collector resistance of transistor Q2 when transistor Q2 is turned on.

Pulses are produced at the collector of transistor Q2 at a repetition rate or frequency of typically 500 per second and with a duration of typically one one-thousandth of a second.

The collector of transistor Q2 is connected to lead 34 which in turn is connected to the centre conductor 21 of the electrode assembly 14 as previously described.

When the electrode assembly 14 is attached to a bottle full of liquid, the centre electrode 21 possesses a capacitance to the upper and lower electrodes 20 and 22, with a slightly larger capacity to the upper electrode 20, since that electrode is larger. While it is true that this obtains whether the bottle is full or empty due to the presence of the tape material and the glass, the addition of the liquid causes a noticeable increase in the two capacitances.

Figure 5B:
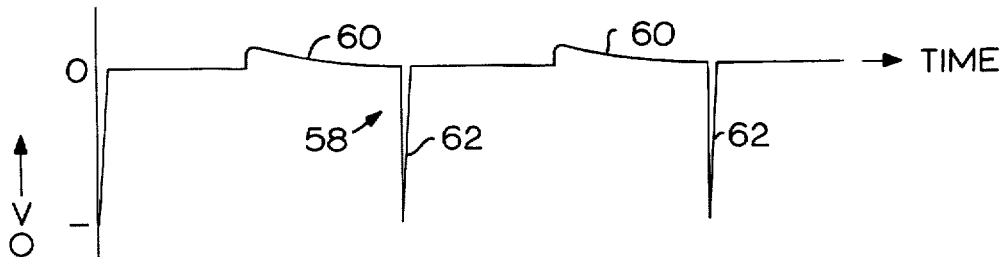

The capacities thus provided are in series connection between Q2 collector resistors R7 and R6 respectively. This causes highly differentiated versions of waveform 52 to appear across resistors R7, R6, typically as shown at 58 in FIG. 5B. The small, long period, positive going portion 60 of waveform 58 is due to the partial first derivative of the positive going edge of the waveform at Q2 collector and the large negative going very short period portion 62 of waveform 58 is due to the partial first derivative of the negative going edge of the waveform at Q2 collector.

The two differentiated waveforms thus obtained are connected to the differential inputs of an operational amplifier 64. Amplifier 64 may typically be an integrated circuit amplifier made by Motorola under No. MC1709CG, and the pin numbers for this amplifier are indicated in the drawing. The function of amplifier 64 is to compare the a.c. voltages at its two inputs (pins 2,3) and to provide at its output (pin 6) a suitably amplified voltage being proportional to the difference between the a.c. voltages at the two inputs, such that in the present instance were the capacities between transistor Q2 collector and the two input pins 2, 3 the same, then the a.c. voltage at the output of amplifier 64 would be zero. In this case the d.c. voltage at the output of amplifier 64 would be equal to that at the junction of resistors R6, R7, R8 and R9, i.e. typically midway in voltage between lines 41, 42. The junction of the above resistors is decoupled to line 42 at the high frequencies represented in waveform 58 by capacitor C10 which ensures that at all but direct current and low frequencies the above junction is at the same potential as line 42 and that therefore the voltages across resistors R6 and R7 truly represent the derivatives shown in FIG. 5B.

As previously described, it has been arranged that the capacities between the transistor Q2 collector and the input terminals of amplifier 64 are unequal when the bottle 2 is filled and the fluid level is above that of the tape. Since the capacity between electrodes 22, 21 is less than the capacity between electrodes 21, 20 under these conditions, therefore, the signal on electrode 22 will be less than that on electrode 20 and the resulting waveform at the output of amplifier 64 will therefore be negative as shown at 64 in FIG. 5C.

Figure 5C:
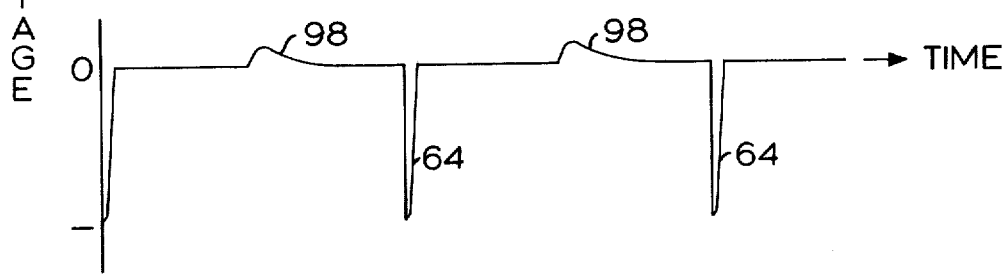

As the bottle empties the fluid level falls gradually to a point below the upper edge of electrode 20, thus reducing the capacity between electrodes 21 and 20 and thereby the signal on electrode 20. When the capacity is reduced to the point where the total capacities between the transistor Q2 collector and resistors R6 and R7 respectively are equal, then the net variation in voltage at the output of amplifier 64 is nominally zero, i.e., the pulses 64 shown in FIG. 5C are reduced to zero. As the fluid level falls further, the signal on electrode 20 reduces below that on electrode 22, resulting in waveforms at the output of amplifier 64 gradually approaching those shown in FIG. 5D, i.e., with large positive going signals 66 in place of the large negative going signals 64 obtained with a full bottle. This change is used as described later to provide a warning signal.

Figure 3:
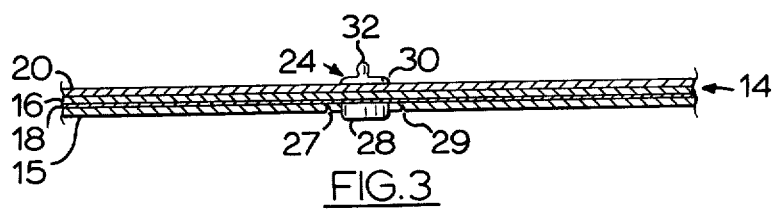
FIG. 3 is a side view of the electrode assembly of FIG. 2.
Figure 3A:
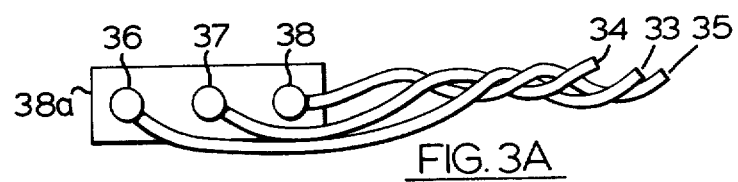
FIG. 3A shows a connector assembly for use with the electrode assembly of FIGS. 2 and 3.

Means are provided to cause a similar change in the output of amplifier 64 (and hence to cause an alarm)

should the connector 38a shown in FIG. 3A be removed from contact with or fall off the electrode assembly taped to the bottle. These means comprise a small bias capacitor C9 connected between electrodes 21 and 22. Capacitor C9 is made sufficiently small that when the bottle 20 is filled with fluid, the total capacitance between electrodes 22, 21 (including that of capacitance C9) is still less than the capacitance between electrodes 20, 21. However, capacitor C9 is large enough so that if the connector 38a falls off the bottle, then the total capacitance between wires 35, 34 becomes greater than that between wires 33, 34. The resulting signal is equivalent to that which occurs when the fluid level drops to the level of centre electrode 21 and produces a high positive going signal at the output of amplifier 64, again operating the alarm. Similarly, should the fluid level fall completely below the electrode assembly, the capacitances between electrodes 20 and 21, and 21 and 22, are both drastically reduced and the additional capacity due to capacitor C9 becomes significant and produces the same result. This feature provides a measure of protection against accidental misuse or patient's displacement of disconnection of the cable to the electronic circuit.

Typical values of the capacities involved (in picofarads or pf) are as follows. It will be assumed that the capacity between the centre and upper electrodes 21, 20 is C100 and that between the centre and lower electrodes is C200 (as shown in FIG. 4 in dotted lines), and of course the bias capacitor is C9.

1. Electrode assembly 14 alone, free off the bottle and disconnected from clip 38a:
   C100 : 0.8 pf
   C200 : 0.68 pf
2. Electrode assembly 14 attached to clean, dry, empty bottle and disconnected from clip 38a:
   C100 : 1.8 pf
   C200 : 1.5 pf.
3. Electrode assembly 14 attached to full bottle of pure water, bottle having a one-sixteenth inch wall, no connection to clip 38a:
   C100 : 28 pf
   C200 : 22 pf The leads 33, 34, 35 and the clip 38a contribute typically an additional 10 pf of permanent capacity between the electrodes when connected, and when the bias capacitor C9 is added, the totals typically are:

4. Leads 33, 34, 35 not connected to electrode assembly:
   a. capacitance between leads to be connected to centre and upper electrodes: 10 pf.
   b. capacitance between leads to be connected to centre and lower electrodes plus c9: 14 pf. (Unit shows alarm.)
5. Leads 33, 34, 35 connected to electrode assembly and electrode assembly taped to empty bottle (so that C100, C200 now include the lead capacitances):
   C100 : 11.8 pf
   C9 + C200 : 15.5 pf (Unit shows alarm.)
6. Same as (5) above but bottle full (pure water):
   C100 : 38 pf
   C9 + C200 : 36 pf (Unit resets.)
7. Same as (6) above but fluid level at centre electrode:
   C100 : 11.8 pf
   C9 + C200 : 36 pf (Unit shows alarm.)

By way of further description of the operational amplifier 64, frequency compensation components R5, C8 and C7 are provided to ensure stable operation at high frequencies. Resistor R4 provides conventional negative feedback to stabilise the direct output voltage and maintain it close to that of the junction of resistors R8 and R9. Since this is about half way between the potentials of lines 42 and 43, this permits the negative and positive pulses obtained at the output of amplifier 64 to be of roughly equal amplitudes although it may be advantageous to increase the permissable amplitude of the negative going pulse at the expense of the positive.

ELECTRONIC CIRCUIT — ALARM TRIGGERING MEANS

Figure 5D:
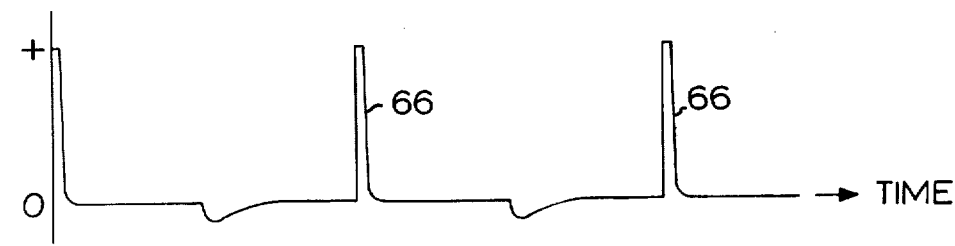

The pulses shown in FIGS. 5C and 5D at the output terminal of amplifier 64 are applied to the "source" terminal 70 of an N-Channel junction field effect transistor Q1 through capacitor C6 provided to block the steady D.C. level at the above output terminal. Resistor R3 provides a discharge path for capacitor C6. The characteristics of transistor Q1 are such that negative voltages between the source terminal 70 and the gate terminal 72 result in a freeflow of current between these terminals while the opposite polarity results in a negligible flow. Thus the negative going waveforms only, shown in FIG. 5C, result in a current flow between these terminals during the application of the short duration pulses. This current flow gradually charges capacitor C4 to a voltage almost equal to the peak amplitude, making the gate terminal 72 of transistor Q1 highly negative with respect to line 42 and the source and drain terminals of transistor Q1. While the gate is thus held negative by a continuous train of such pulses, no other current may flow through any terminal of transistor Q1. Specifically, no current may flow through the drain terminal 74 which thus remains at the potential of line 42 i.e., zero.

Once the liquid level in the bottle has fallen to the desired alarm level, as previously described, the negative output signals decay. Capacitor C4 then discharges gradually through R2, in typically half of one second if so allowed by the rate of decay. At some lower level the characteristics of transistor Q1 will allow current to flow through the channel circuit, i.e., between the source 70 and the drain 74, when the source 70 becomes either positive or negative resulting in similar potentials at the drain terminal.

Negative potentials with respect to line 42 will not be passed by diode D5. Although this is not otherwise important this allows all source current during negative excursions of transistor Q1 source terminal 70 to flow into capacitor C4, thus efficiently building up Q1 gate blocking voltage.

As the negative output signals of amplifier 64 decay and are replaced by positive voltage excursions as shown in FIG. 5D, current will now pass through transistor Q1 channel, through diode D5, and through the gate cathode circuit of a silicon controlled rectifier SCR1. The anode and cathode of rectifier SCR1 are connected respectively to lines 41 and 42. When the positive pulses are received at the gate of rectifier SCR1, its main terminals will then pass their full current while the anode terminal is typically at least 1 volt positive with respect to the cathode terminal. Further this current will continue to flow while this condition exists regardless of the current or absence of it into the gate terminal. The device will thus act as a switch which may only be reset by removal of the anode voltage as described later. The switch thus formed effectively short circuits the terminals 39 and 40 through diodes D1, D2, D3, D4 so long as current continues to flow.

Where the electronic circuit is activated by alternating current, current could cease flowing at every zero of the incoming AC voltage. However, the presence of capacitor C5, which is charged at this point, will cause an adequate current to be maintained through resistor R13 for a short period after the input to terminals 39 and 40 has been removed as later described. This maintains the circuit, and rectifier SCR1, operative for an adequate period, typically several input cycles.

When rectifier SCR 1 operates, it effectively places a closed switch across terminals 39 and 40 as shown above and operates a typical hospital alarm system, as will now be described with reference to FIG. 6.

HOSPITAL ALARM SYSTEM

Figure 6:
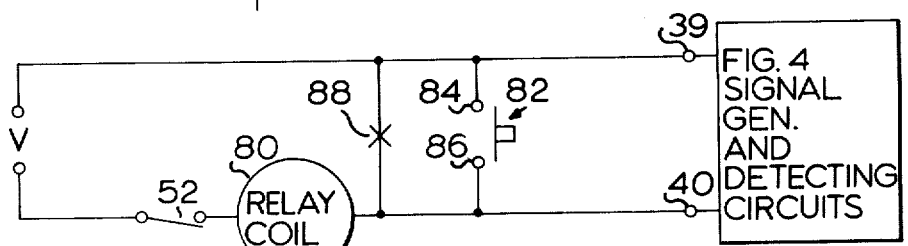
FIG. 6 is a circuit diagram, partly in block form, showing connection of the FIG. 4 circuit to a typical hospital alarm system.

FIG. 6 illustrates a typical hospital alarm system. Such alarm system includes a voltage supply V connected through a switch S2 and the coil of a relay 80 to a push button 82. When a patient pushes the push button 82, bridging its contacts 84, 86, the circuit through the relay 80 is completed. Relay 80 then operates and locks operated through its normally open contacts 88 (which close upon relay operation), and a set of normally open working contacts 90 of the relay 80 also close to energize an alarm. As indicated in FIG. 6, the alarm may typically consist of a bell 92 and a light 94 connected through a battery or power source 96 to the contacts 90. After the nurse has responded to the alarm, she opens the switch S2 momentarily to de-energize the relay 80, thus resetting the circuit.

When the FIG. 4 circuit is used with the alarm system shown in FIG. 6, then terminal 39 is connected together to terminal 84 at one side of the push button switch 82 and terminal 40 is connected together to terminal 86 at the other side of the push button switch. With the component values listed, and with intravenous fluid between the transmitting and receiving electrodes so that rectifier SCR 1 is off, the circuit FIG. 4 draws far less current (about 2 milliamps) than is required to operate the relay 80 in most hospital alarm systems, so that relay 80 remains off. Resistor R13 limits the initial charging current of capacitor C5 to a value below the operating current of relay 80 so that the relay 80 will not operate when the circuit FIG. 4 is initially energized.

When the intravenous fluid in the bottle 2 drops below the level of the centre electrode 20, turning on rectifier SCR1, that rectifier in effect connects terminals 84, 86 together, thus simulating the operation of the push button. Relay 80 then operates and locks operated through its contact 88, operating the bell 92 and lamp 94. It will be noted that when rectifier SCR 1 operates, it short circuits the power supply to the electronic circuits, but the energy stored in the capacitor C5 allows rectifier SCR 1 to remain operated for a sufficient period that it can operate relay 80.

If the hospital alarm system is of the type requiring extremely low current for operation, then terminals 39 and 40 of FIG. 4 will remain connected across the bell push button 64 but line 41 may be broken at point 43 (FIG. 4) and external power may be supplied between resistor R13 and line 42.

It will be realized that rectifier SCR1 may be used to switch on any appropriate alarm system and not only that shown in FIG. 6.

The use of field effect transistor Q1 and its associated circuitry provides a substantial degree of protection against faulty although safe operation due to local radiated noise. Negative noise pulses will of course have no effect, since they will merely have the same effect as pulses 62 of FIG. 5B. Any positive noise signals having a slow rise time will likewise have little effect, for the same reason as the leading edge 54 of waveform 52 produces only a small positive blip 98 (FIG. 5C); their derivative is small. However, positive noise pulses even of small amplitude received by electrodes 20, 22 will result in a positive going signal at the output of amplifier 64 (just as negative going pulses received by electrodes 20, 22 results normally in a negative going signal at the amplifier 64 output). Since a positive going signal at the output of amplifier 64 is used as an alarm condition, a false alarm would therefore be given.

When transistor Q1 is used, the positive going noise signals will have no effect unless the energy that they produce at the inputs to amplifier 64 exceeds that produced by the combination of waveform 52 and any negative going noise signals, and unless they last long enough to allow capacitor C4 to discharge. This is an unlikely occurrence, and therefore the likelihood of false operation of the alarm is reduced.

The electronic system described above is capable of detecting minute variations in capacity due to the high amplification of amplifier 64 and the high degree of discrimination provided by the differential system used and has therefore proved suitable for use on fluids of widely varying conductivities, viscosities and wetting properties.

In cases where a film of moisture may form on the outside of the intravenous bottle, the exterior surfaces of the electrodes 20, 21 and 22 may be insulated. This can be achieved by coating the electrodes with a film or layer of plastic or silicone or by simply smearing petroleum jelly or the like on the outside of the intravenous bottle at the location of the electrodes before applying the electrode assembly. If the electrodes are aluminum and are connected only at their upper surfaces to the terminals 24, 25 and 26, then the lower surface of the aluminum can be anodized to act as an insulator.

The size and shape of the electrodes can be varied, but their size should be sufficient to reduce losses in transmission and detection of the pulses. In one successful system made in accordance with the invention, the area of each electrode was approximately 1 square inch. If the electrodes are made too small, then the sensitivity of the circuit must be increased, and this increases the susceptibility of the system to interference by noise. If they are made too large, they will not readily fit on a standard intravenous bottle.

Figure 7:
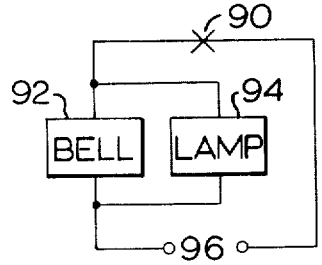
FIG. 7 is a top view of a modification of the electrode assembly of FIGS. 1 to 3.
Figure 7:
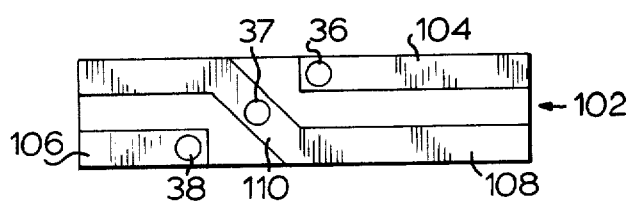

Other forms of electrode assemblies besides those shown may be used. For example, the electrode assembly shown at 102 in FIG. 7 may be used. The electrode assembly 102 is the same as electrode assembly 14 except that the upper and lower strips 104, 106 are spaced sideways of each other, and the centre strip 108 runs below the upper strip 104, up through the lateral space between the upper and lower strips as indicated at 110, and above the lower strip 106. A disadvantage of this arrangement is that it is more difficult to produce than the assembly 14, where the strips are of equal width and the spaces between them are of equal width, so that a single supply tape can be sliced at alternate 45 degree angles to produce a series of assemblies 14 without any wastage.

Figure 2:
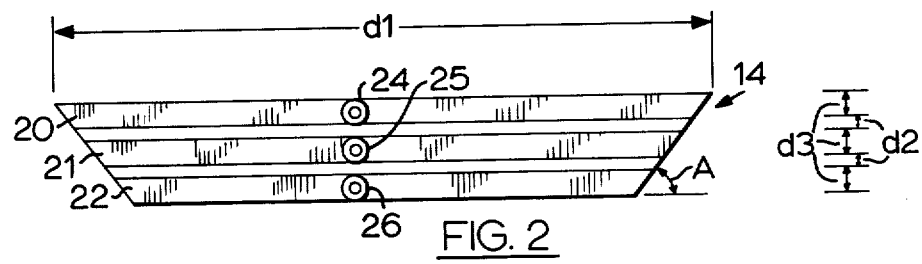
FIG. 2 is a top view of the electrode assembly of FIG. 1.

Preferred dimensions for the electrode assembly 14 are as follows (with reference to FIG. 2):

d1 (length of assembly at its top): 6 inches
angle A (angle of cut of ends of tape): 45°
d3 (width of each electrode strip): ¼ inch
d4 (spacing between electrode strips): ⅛ inch With this arrangement, an alarm signal will occur when the liquid level in the bottle 2 falls below the centre line of the upper electrode 20.

I claim:

1. Apparatus for detecting the level of fluid in a non-conducting container and comprising:
   a. detector means mountable against the exterior surface of said container and having three spaced capacitance plate members, namely an upper member, a lower member and a middle member between said upper and lower members, the capacity between said upper and middle members being $C_1$, the capacity between said lower and middle members being $C_2$, and the value of $C_1$ being greater than that of $C_2$ when said detector means is located in air and also when said detector means is mounted on said container with the fluid level in said container above or below said detector means,
   b. circuit means including a bias capacitance of capacity $C_3$ detachably connected between said lower and middle members, the value of $C_3$ being such that when said detector means is located in air or on said container with the fluid level in said container below said upper member, the value of $C_1$ is less than the combined values of $C_2$ and $C_3$, and when said detector means is on said container with the fluid level in said container above said upper member, $C_1$ is greater than the combined values of $C_2$ and $C_3$,
   c. said circuit means including means for comparing the value of $C_1$ with the combined values of $C_2$ and $C_3$ and operative to produce an alarm signal when the value of $C_1$ is less than the combined values of $C_2$ and $C_3$.

2. The invention according to claim 1 wherein said detector means is a piece of disposable flexible adhesive tape, said plate members being flexible electrode strips located on said tape.

3. The invention according to claim 2 wherein said electrode strips are all strips of uniform and equal width, said upper member being longer than said lower member.

4. The invention according to claim 3 wherein said tape has a pair of ends and said electrode strips extend to said ends, said ends each being cut at an angle of 45° and sloping toward each other from top to bottom.

5. The invention according to claim 2 wherein said upper member is a strip of first length, said lower member is a strip of second length, said upper member being spaced above and sideways of said lower member, and said middle member is a strip extending below said upper member and then upwardly through the lateral space between said upper and lower members and then above said lower member.

6. The invention according to claim 1 wherein said means for comparing includes means for producing an output signal having a first polarity when $C_1$ is greater than $C_2$ plus $C_3$, and a second polarity when $C_1$ is less than $C_2$ plus $C_3$, and delay means responsive to receipt of said output signal when said output signal is of said first polarity followed by change of said output signal to said second polarity to generate said alarm signal only after said change has endured for a predetermined time interval.

7. The invention according to claim 6 wherein said means for producing said output signal includes means means for generating a series of pulses each having one edge of gradual slope and a second edge of steep slope, means for applying said pulses to said middle member so that said pulses are received by said upper and lower members, a differential amplifier having a pair of inputs and an output, means for differentiating the signal received by said upper member and for applying such derivative to one input of said amplifier, and means for differentiating the signal received by said lower member and for applying that derivative to the other input of said amplifier, said output signal being a differential signal produced at said output.

8. The invention according to claim 7 wherein said means for generating said alarm signal includes a field effect transistor having a gate, source and drain, said source being connected to said output of said amplifier, trigger means connected to said drain and responsive to receipt of a signal therefrom for generating said alarm signal, a bias means comprising a parallel resistance and capacitance connected to said gate and responsive to signals of said first polarity for blocking transmission of signals from said source to said drain and when said output signal changes from said first to said second polarity allowing said output signal after said predetermined interval to pass from said source to said alarm to operate said trigger means.

9. A disposable electrode assembly for use with apparatus for detecting the level of fluid in a non-conducting container and comprising a piece of adhesive tape, three flexible electrode strips adhered to said tape, said strips being an upper strip, a lower strip, and a middle strip located between said upper and lower strips, the capacity between said upper and middle strips being greater than that between said middle and lower strips when said assembly is located in air or is adhered to said container with the fluid level in said container above or below said assembly, and terminal means connected to each strip for detachably connecting a lead to each electrode strip.

10. An assembly according to claim 9 wherein said strips are each of uniform and equal width and the spacing between said upper and middle strips is equal to the spacing between said middle and lower strips, said tape having a pair of ends and said strips extending to said ends, said ends each being cut at an angle of 45° and sloping toward each other from top to bottom.

11. An assembly according to claim 9 wherein said upper strip is of first length, and lower strip is of second length, said upper strip being spaced above and sideways of said lower strip, said middle strip extending below said upper strip and then upwardly through the lateral space between said upper and lower members and then above said lower member, said second length being less than said first length.

12. A disposable electrode assembly for use with apparatus for detecting the level of fluid in a non-conducting container for intravenous fluid, said assembly comprising: a flexible backing member, three flexible electrode strips mounted on said backing member and spaced apart from each other, said strips being an upper strip, a lower strip, and a middle strip located between said upper and lower strips, said assembly thus having a first capacitance between said upper and middle strips and a second capacitance between said middle and lower strips, each said strip including means adapted to be detachably connected to a lead, said assembly having an adhesive thereon so that said assembly can be adhered to the outside surface of said container with said electrode strips in close proximity to said outside surface, and so that said assembly may be removed from said container after use.

13. A disposable electrode assembly according to claim 12 wherein said electrode strips are parallel to each other and are all of the same width and are equally spaced apart from each other.

14. Apparatus according to claim 12 and further including circuit means detachably connected to said electrode strips for comparing said first and second capacitances and for producing an alarm signal consequent upon a selected change in the relative values of said capacitances when the fluid level falls to a selected level below the top of said upper strip in a container to which said assembly is attached.

15. Apparatus for detecting the level of fluid in a non-conducting intravenous container and comprising:
 1. a disposable electrode assembly comprising: a flexible backing member, three flexible electrode strips mounted on said backing member and spaced apart from each other, said strips being an upper strip, a lower strip, and a middle strip located between said upper and lower strips, said assembly thus having a first capacitance between said upper and middle strips and a second capacitance between said middle and lower strips, each said strip including connection means adapted to be detachably connected to a lead, said assembly having an adhesive thereon and being removably adhered to the outside surface of said container with said electrode strips in close proximity to said outside surface, and so that said assembly may be removed from said container after use,
 2. circuit means, and means detachably connected to said connection means and connecting said electrode assembly to said circuit means,
 3. said circuit means including means for comparing said first and second capacitances and for producing an alarm signal consequent upon a selected change in the relative values of said capacitances when the fluid level in said container falls to a selected level below the top of said upper strip.

* * * * *